Feb. 13, 1945. A. L. LOWELL ET AL 2,369,152
MEANS FOR OPERATION OF BELLOWS-TYPE WING FLAP AND THE LIKE
Filed June 7, 1943 5 Sheets-Sheet 5

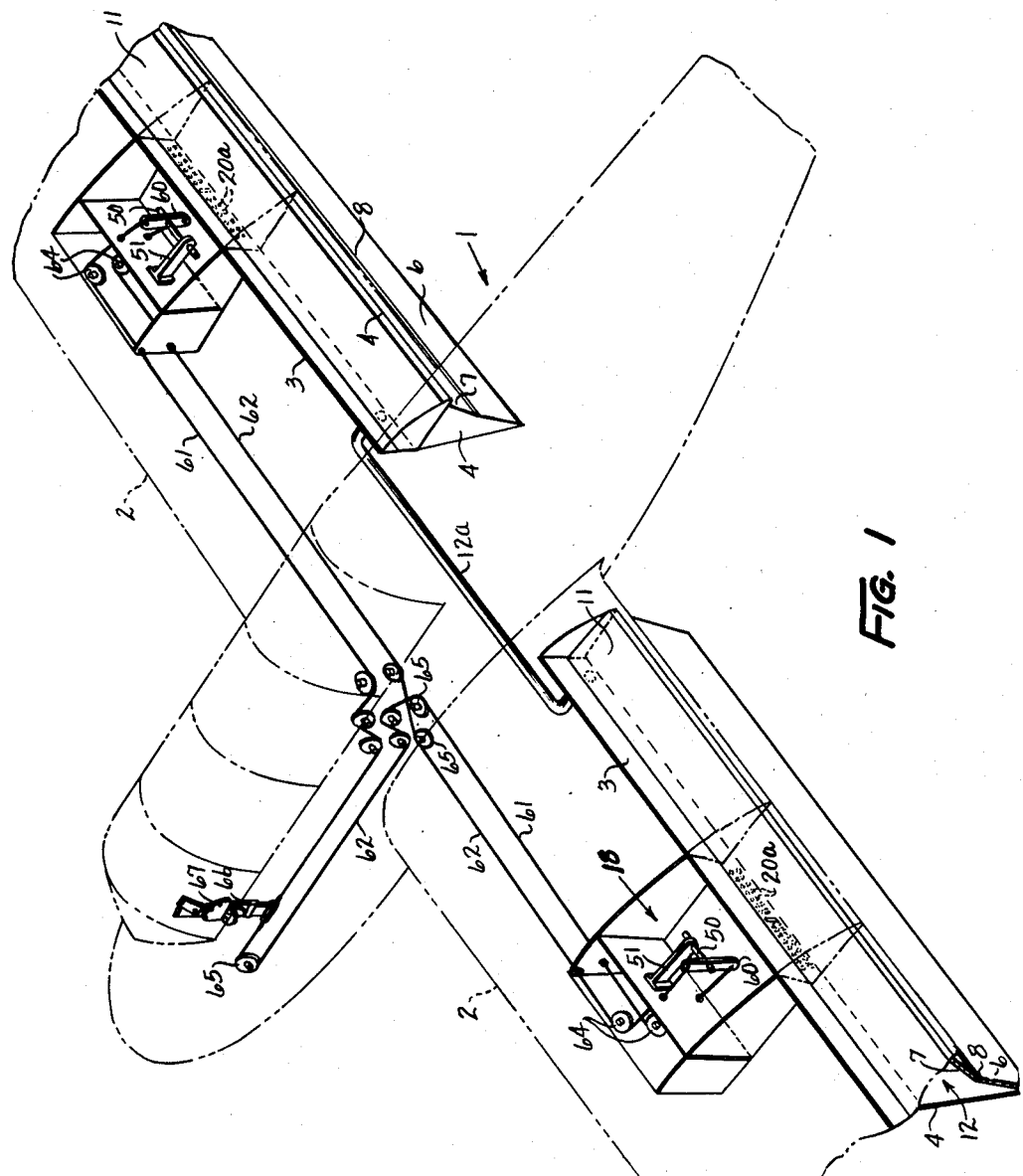

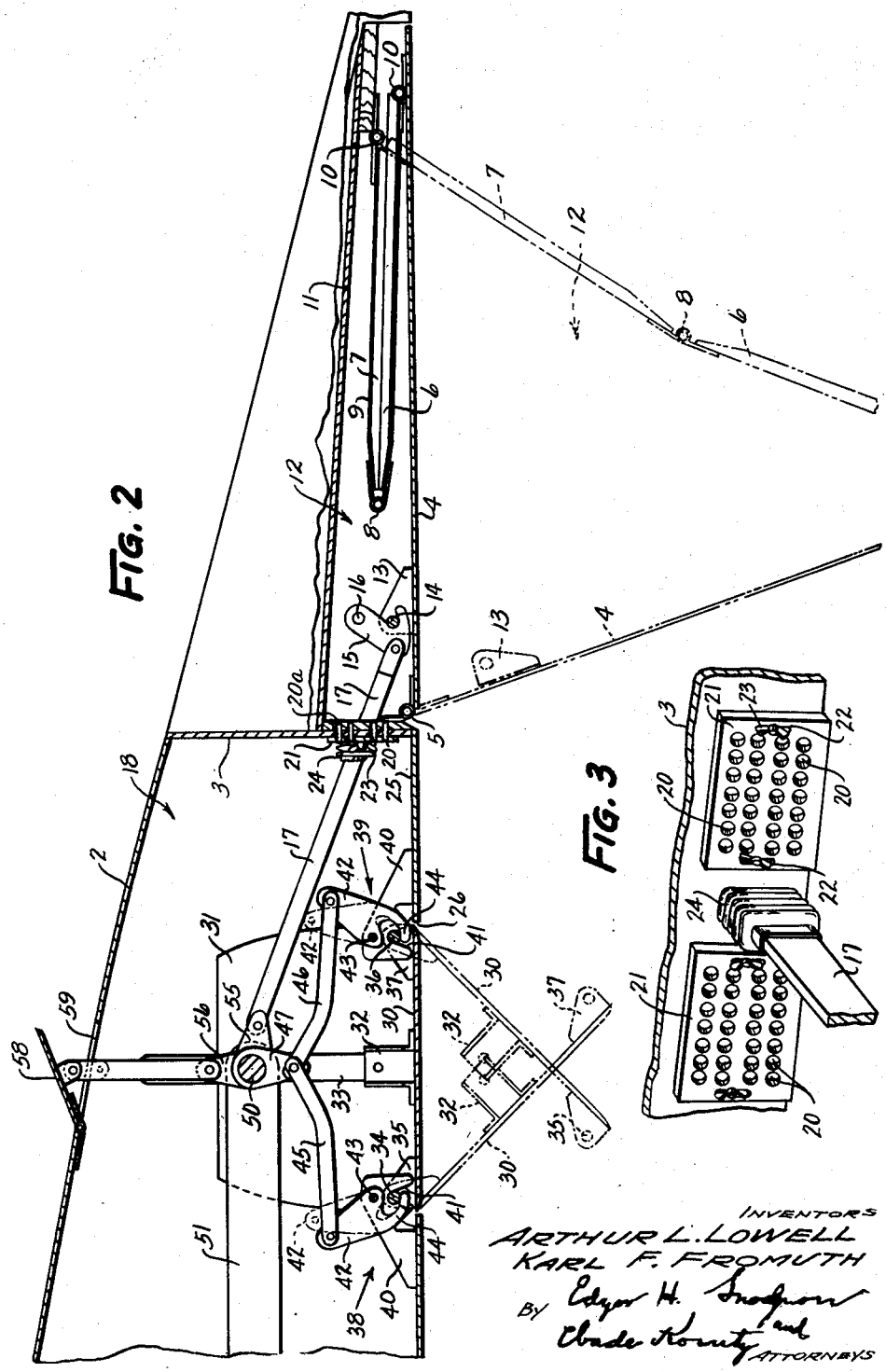

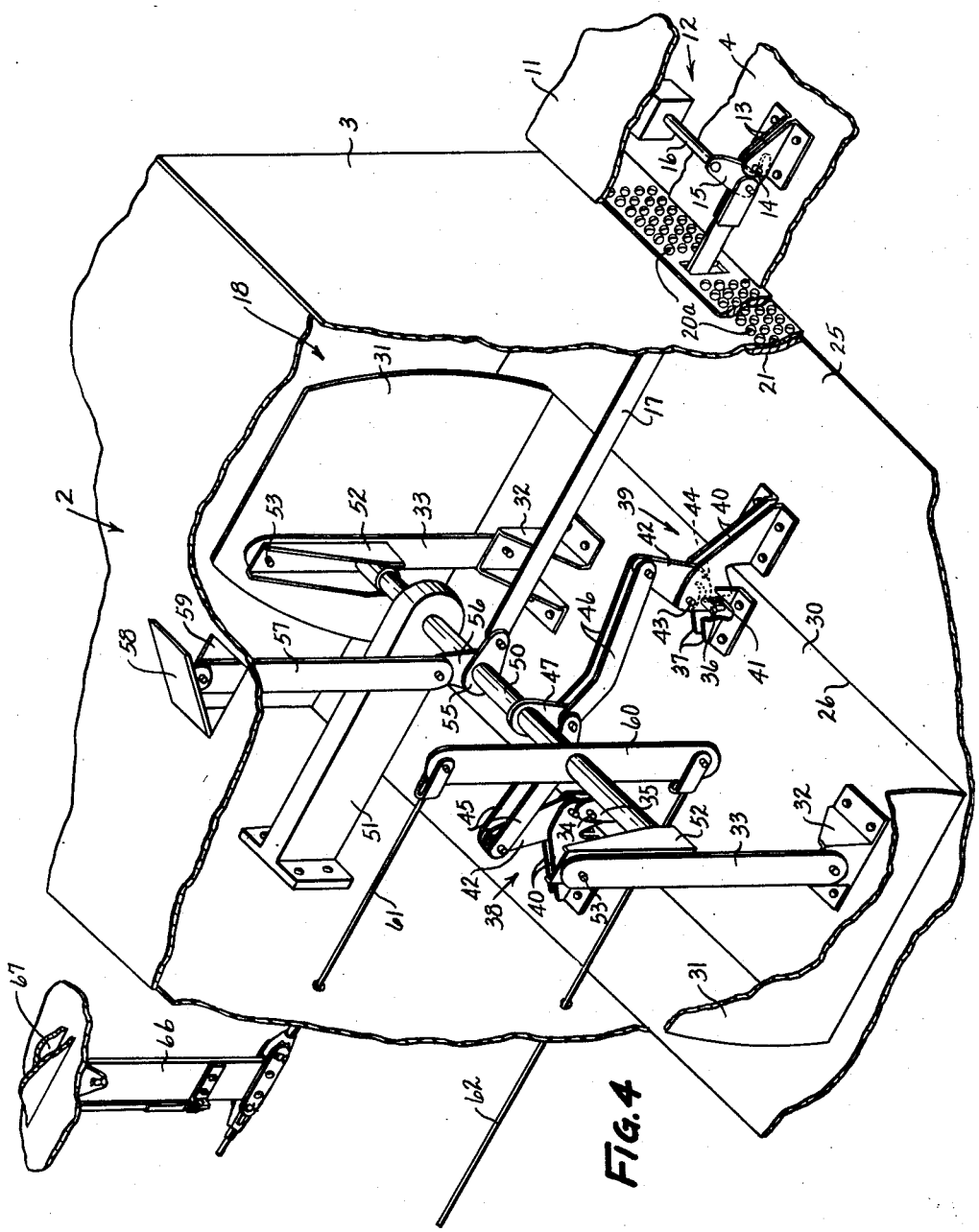

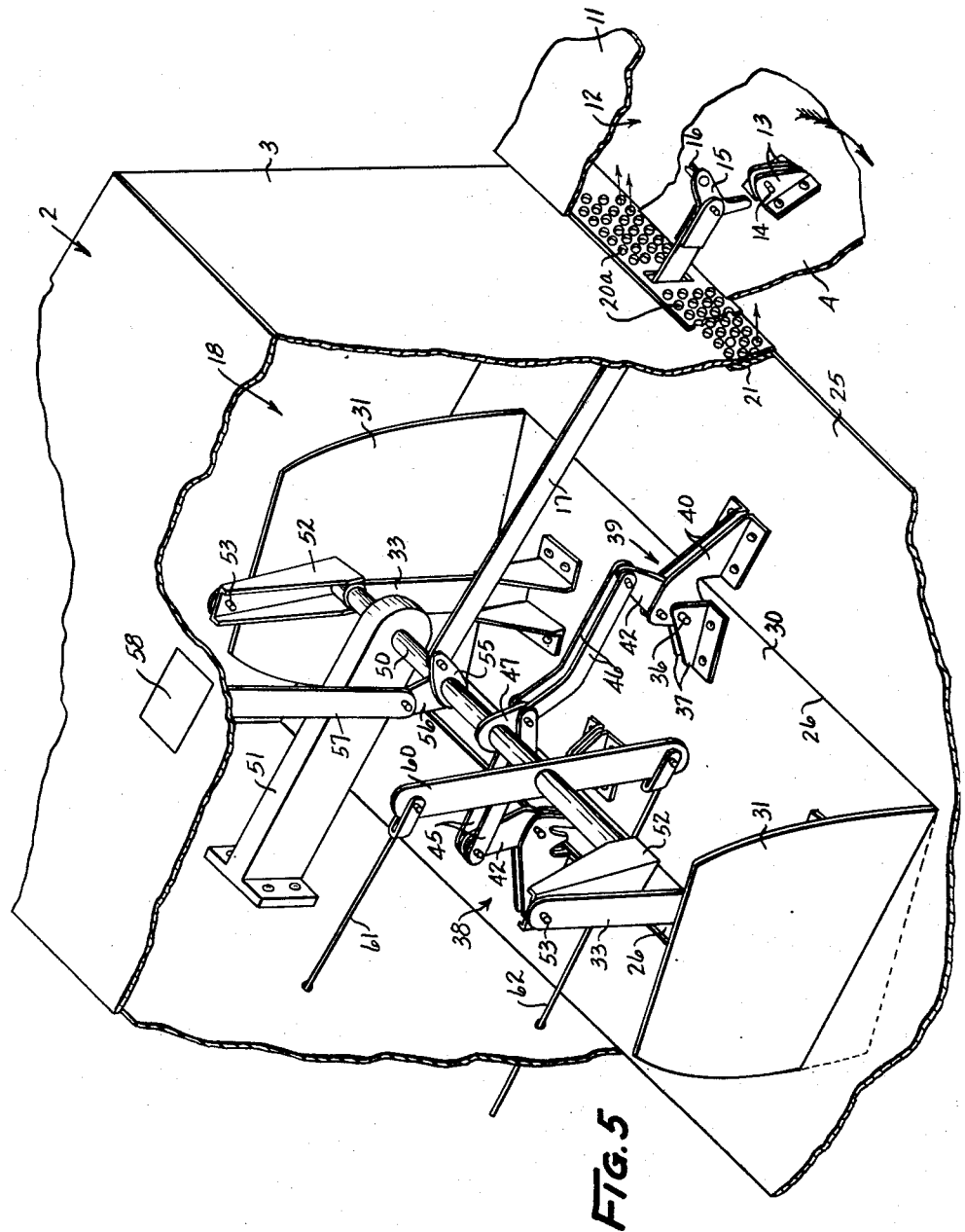

INVENTORS
ARTHUR L. LOWELL
KARL F. FROMUTH
BY
ATTORNEYS

Patented Feb. 13, 1945

2,369,152

UNITED STATES PATENT OFFICE 2,369,152

MEANS FOR OPERATION OF BELLOWS-
TYPE WING FLAPS AND THE LIKE

Arthur L. Lowell, New York, N. Y., and Karl F.
Fromuth, South Bend, Ind.

Application June 7, 1943, Serial No. 489,944

8 Claims. (Cl. 244—42)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to improvements in bellows operated flaps for aircraft and control mechanism therefor.

The idea of employing an expansible chamber in the form of a bellows as an actuating means for a flap and employing fluid pressure for energizing the bellows is broadly old, being disclosed in French Patent No. 577,093, granted to Brequet. It has also been proposed to employ a scoop movable into the air stream to conduct air under pressure into the interior of the bellows to expand the same and lower the flap against the resistance of retracting springs. This latter proposal had the disadvantage that due to the limited space available, retracting springs have a poor working angle so that if the springs are made light enough to permit operation of the bellows, the flaps due to leakage of positive pressure into the bellows will droop in normal flight adding unnecessary drag and with the use of retracting springs the flap opening is delayed until sufficient excess pressure is built up in the bellows to overcome spring force and then the bellows open suddenly with considerable shock even though air flow restricting means are employed intermediate the bellows and the scoop. Further, no accurate balance can be maintained between opening and retracting forces so that the rate of angular deflection of the flap cannot be controlled.

In accordance with the present invention a control scoop is provided which can be moved in one direction such that air from the relatively moving air stream is led by a conduit to the interior of the bellows to expand the same to lower the associated flap, while if the scoop is moved in the opposite direction from a neutral position it will present itself to the relatively moving air stream such as to produce a suction or ejector effect lowering the pressure within the bellows from the ambient atmospheric pressure such that the bellows will collapse due to the pressure differential and the flap will be retracted. Moving the control scoop to the neutral position will actuate locking mechanism which will lock the control scoop and simultaneously lock the flap in the retracted position, and means are also provided for bleeding any excess of positive pressure from the interior of the flap when the same is in the retracted position to relieve the flap and scoop locking means from excessive loads. Air flow restricting means adjustable on the ground are interposed in the path of flow to or from the bellows which controls the rate of flap operation and avoids the shock loads of sudden opening or retraction. Means are also provided for interconnecting the bellows chambers on opposite wings for pressure equalization to thereby provide for synchronism of flap movement.

The principal object of the present invention is the provision of a bellows operated flap mechanism having a control scoop mechanism operable to produce a pressure derived from the relatively moving air stream which is greater or less than the ambient atmospheric pressure, said pressure being selectively operative to inflate or deflate the bellows to provide for flap deflection and retraction respectively at a controlled rate and means for locking the control scoop and flap when the latter is retracted.

It is also an object of the invention to provide in a bellows operated flap system of the character described a simple single pilot operated control means for selectively causing flap deflection, flap retraction and flap locking in the retracted position and to prevent positive pressure leakage from overloading the bellows and locking mechanism when the flap is retracted.

A further object of the invention is to provide a pressure equalizing connection between two or more bellows operated flap operating means to insure synchronization of flap deflection and retraction.

Other objects of the invention not specifically enumerated will appear by reference to the detailed description hereinafter given and to the appended drawings in which:

Fig. 1 is a schematic view illustrating the arrangement of the flaps and the manual control system on an aircraft such as a glider;

Fig. 2 is a side illustration partly in section illustrating the bellows, flap and scoop control mechanism;

Fig. 3 is a fragmentary view illustrating the details of an adjustable air flow regulating means for controlling rate of flap movement;

Fig. 4 is an isometric view illustrating the details of the scoop control and locking mechanism in the neutral position of the scoop control;

Fig. 5 is a view similar to Fig. 4, but showing the scoop control and locking mechanism in the position to cause flap extension.

Figure 6:
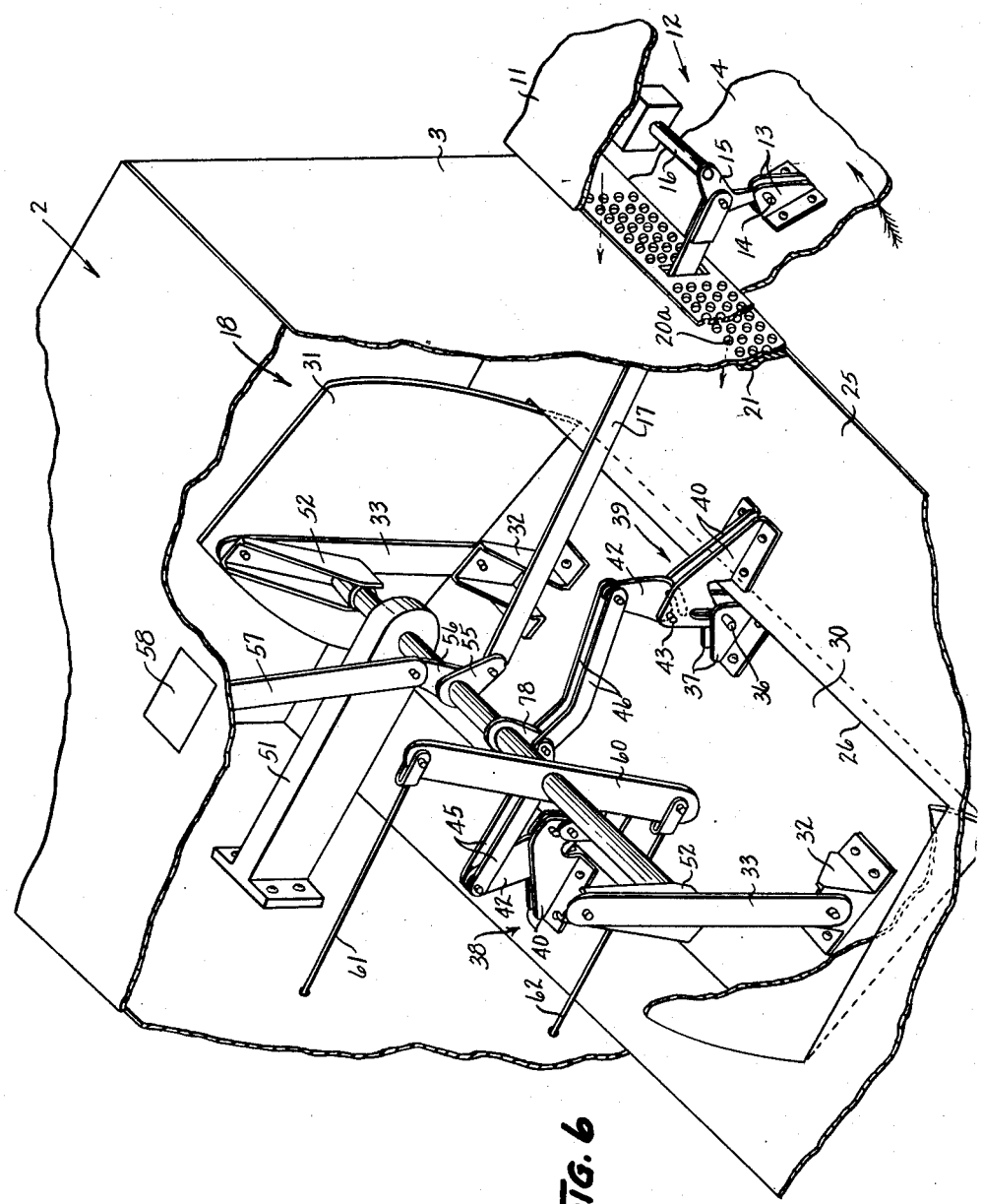
Fig. 6 is a view similar to Fig. 4, but showing the scoop control in the position to cause flap retraction.

Referring now to Fig. 1, the reference numeral 1 generally indicates an aircraft such as a glider having wing panels 2 each of which is provided with a false spar 3 to which is pivotally secured a conventional type split flap 4 which is pivotally mounted as at 5 by means of hinges or the like (see Fig. 2). Stiffening ribs 6 and 7 pivotally connected at 8 and covered by impermeable fabric 9 (see Fig. 2) interconnect the trailing edge portion of the flap 4 to the trailing edge of the aircraft wing to form a bellows for extending and retracting the flaps. The interior of the bellows 10 is sealed at its upper side by means of a continuous panel 11 secured to the wing structure so as to form an expansible chamber 12 associated with each respective bellows, and the bellows chambers 12 being interconnected by means of a conduit 12a, the function of which will be hereinafter described. The extension and retraction of the flaps 4 by means of the bellows and under the control of a specific control mechanism will now be described.

Referring now to Fig. 2, the bellows members 6 and 7 hinged at 8, and covered by the impermeable fabric 9, are connected by means of suitable hinges 10 to the after portion of the wing 2 and to the flap 4 adjacent the trailing edge of the latter, such that if air is forced into the bellows, the flap 4 will be extended to the dotted line position as shown in the figure, and if the pressure within the bellows is reduced below the ambient atmospheric pressure, the bellows will be retracted to the position as shown in full lines in Fig. 2. Adjacent the hinge axis 5 a pair of brackets 13 is secured to the flap 4 and supports a locking pin 14 which is adapted to be latched by means of a hooked latch member 15 pivotally supported as at 16 from the aircraft wing structure, the latch 15 being operable to retain flap 4 and bellows elements 6 to 10 inclusive in the retracted position. The latch member 15 is adapted to be actuated by means of a push-pull lever 17 which passes through a suitable aperture cut in the false spar 3. A second chamber 18 formed by the wing covering structure and a pair of adjacent covered ribs serves as a conduit to conduct air to or from the bellows chamber 12 to the outside atmosphere on the underside of the wing, the chamber 18 being in communication with the expansible bellows chamber 12 by means of adjustable throttling orifices such as illustrated in detail in Fig. 3 and which comprise a pair of plates 21, each having a series of small ports 20 therein adapted to register with similar ports 20a cut through the false spar member 3. Each of the plates 21 is provided with vertical slots 22 and adjustable clamping screws 23 such that the plates may be moved vertically while the aircraft is on the ground so as to vary the size of openings furnishing communication between chambers 12 and 18, the ports 20 and 20a serving as adjustable throttling orifices to control rate of flow to or from the bellows chamber 12 for the purpose of regulating the rate of flap extension or retraction. A flexible boot 24 secured at one end to the false spar 3 and at its other end to the push-pull lever 17 is provided for the purpose of preventing leakage along the lever to or from bellows chamber 12.

Referring again to Fig. 2, the bottom wall of the chamber 18 is provided with a removable panel 25 which is removable for the purpose of adjusting the throttling orifice plates 21 previously mentioned, and is also provided with a rectangular opening 26 which serves as a port for communication between the chamber 18 and the relatively moving air stream on the underside of the aircraft wing 2. A plate member 30 slightly smaller than the rectangular opening 26 is normally positioned such as to substantially seal the opening 26 and to lie flush with the contour of the undersurface of the wing 2, as shown in Fig. 2, the plate 30 being hereinafter generally referred to as a control scoop. The scoop member 30 is provided with end plates 31 which serve to prevent escape of air laterally along the plate so as to generally define with the plate a scoop construction. The plate 30 is provided with centrally positioned spaced bracket members 32 which are pivotally connected to crank links 33 and by which either the leading or trailing edges of the plate member 30 is lowered to form either an air scoop or an air deflector or ejector as indicated in the dotted line positions in Fig. 2. Locking hinge assemblies generally indicated by reference numerals 38 and 39 are provided at the leading and trailing edge portions of the scoop assembly 30 to either co-jointly lock the scoop assembly in a neutral position such as illustrated in full lines in Fig. 2, or to be alternately released to allow the plate member 30 to be deflected at either its leading or trailing edge and the other of the locking assemblies simultaneously serving as a hinge to support the plate 30 for rotation. The lock and hinge assemblies 38 and 39 are of identical construction and corresponding parts are illustrated by the same reference numerals, and adjacent the entering or leading edge of the plate member 30 is a locking and hinge pin 34 secured by the spaced brackets 35 and which pin is adapted to be held in a slot 41 formed in bracket members 40 forming a part of the locking hinge assembly 38. A rotatable latch member 42 pivotally supported at 43 between the brackets 40 is provided with a locking tongue 44 which is adapted to engage the locking pin 34 to hold the same in locked position but to permit a rotation of the plate 30 about the pin 34 as an axis. It will be noted by reference to Fig. 2 that the rotatable latch member 42 of the lock assembly 38 can be rotated in a counterclockwise position from that as shown in Fig. 2 without releasing the pin 34 while if moved in a clockwise position from the neutral position as shown in Fig. 2, the latching tongue 44 will be withdrawn from beneath the pin 34 to allow the leading edge of the plate 30 to be lowered. The locking assembly 39 includes a pin 36 supported between spaced brackets 37 secured adjacent the trailing edge of the plate 30 and adapted to cooperate with a corresponding locking member 42 and associated structure identical to that previously described with reference to the locking assembly 38. When the rotatable latching member 42 of locking assembly 39 is rotated in a clockwise sense, the pin 36 will be retained in a locked position but will permit rotation of plate 30, while rotation of the latching member 42 in a counterclockwise sense will cause release of the pin 36 and allow the trailing edge portion of the plate 30 to be deflected downward into the relatively moving air stream. The latching members 42 of the locking assemblies 38 and 39 are respectively connected by means of double links 45 and 46 to a common crank lever 47 rigidly secured to a rotatable actuating shaft 50 so that upon rocking of the shaft 50 from the position as shown in Fig. 2, in either direction, will cause continued locking of one end of the plate 30 and release of the other end of the plate, while when in the neutral position, both locking assemblies are effective to retain the scoop plate member 30 in a neutral position as shown. The means for rotating the shaft 50 constitutes the control mechanism for the flap which will now be described.

By reference to Fig. 4 the crank levers 33 are each seen to be pivotally connected as at 53 to crank arms 52 mounted on the ends of the shaft 50, the latter being suitably journalled in bearings provided in a plurality of supporting arms such as 51 only one of which is shown for purposes of clarity of illustration. The arm or bracket 51 is suitably supported by the aircraft structure such as a spar or the like which forms a closure for the forward end of the chamber 18. It will be noted that rocking of the shaft 50 in either direction from the neutral position as shown in Fig. 4 will cause the cranks 33 to move downward to effect a deflection of either the entering or trailing edge of the scoop plate 30 depending upon which end of said plate has been released by the respective locking mechanisms 38 and 39 previously described. A crank arm 55 is rigidly secured to the shaft 50 and is pivotally connected to the outer end of the push-pull arm 17, and upon rotation of the shaft 50 in a counterclockwise sense as seen in Fig. 4 will cause a release of the latching member 15 which cooperates with latching pin 14 to hold the flap 4 in a retracted position as previously described. The shaft 50 also has a crank arm 56 secured thereto in a substantially vertical position and which is connected by means of a link 57 to a small flap 58 positioned upon the upper surface of the wing 2 and adapted when open to allow communication between chamber 18 and the upper surface of the wing through the port 59. An actuating lever 60 is rigidly mounted intermediate its ends onto the shaft 50 and is pivotally connected at its respective ends to actuating cables 61 and 62, which as seen in Fig. 1 pass over suitable guide pulleys 64 and 65 and are joined in a continuous band to actuate the respective control levers 60 simultaneously in the same direction, the cables being secured in common to an actuating lever 66 pivotally supported in the aircraft cockpit and adapted by means of a notched sector plate 67 to be positioned in any one of three positions; that is, flap extended, flap retracted and flap retracted and locked in neutral position.

Referring again to Fig. 4, when the lever 60 is in the neutral position as shown, the flap 4 will be latched by means of co-action between the latching pin 14 and latching lever 15 and both of the lock assemblies 38 and 39 will be effective to positively latch the scoop member 30 against rotation in either direction and link members 33 will be in their highest position holding the scoop assembly such that the plate 30 is substantially flush with the removable cover plate 25 and conforming smoothly with the undersurface of the aircraft wing 2 such that the scoop creates substantially no aerodynamic resistance, and also the flap being locked in its retracted position offers substantially no aerodynamic resistance. Since, however, the positive pressure on the undersurface of the airfoil or wing 2 is greater than the ambient atmospheric pressure, any leakage of air around the marginal edges of the port 26 into the chamber 18 will pass through ports 20 and 20a into bellows chamber 12 and tend to inflate the bellows and to unduly load the locking mechanism 14 and 15; and to prevent an undue pressure increase within the chamber 18, the crank 56 and lever 57 are so arranged that in the neutral position the lever 57 will open the small flap 58 on the upper surface of the wing to allow a communication by means of the small opening or port 59 with the low pressure area existing above the upper surface of the wing such that any increase in pressure within the chamber 18 is offset by withdrawal of air through port 59 to the upper surface of the wing which very effectively prevents any increase in pressure from tending to inflate the bellows and unduly load the locking mechanism and, in fact, the port 59 may be made of such dimensions as to maintain a pressure within the chamber 18 substantially equal to the ambient atmospheric pressure. When the lever 60 is rotated to the neutral position as shown, the control lever 66 positioned in the pilot's cockpit is latched by a detent cooperating with the sector plate 67 which prevents the flaps from being extended except at the will of the pilot.

In order to cause the extension of the flaps, the pilot rotates the lever 66 (Fig. 1) to its forward position and there locks the same which causes counterclockwise rotation of the levers 60 to cause extension of the flap as will be best understood with reference to Fig. 5. In this figure it is seen that the forward locking assembly 38 has been released by counterclockwise rotation of the shaft 50 while the locking assembly 39 remains operative to serve as a hinge for the trailing edge of the scoop plate 30 as previously described, and the cranks 52 are rotated forward to cause the crank links 33 to descend which causes the leading edge of the scoop member 30 to project into the relatively moving air stream and to deflect air through the opening or port 26 into the chamber 18 where its dynamic head will be converted into static pressure in the chamber 18 and will pass at a controlled rate of flow through the ports 20—20a into the bellows chamber 12. Counterclockwise rotation of the shaft 50 will also through crank 55 actuate the lever 17 to release the locking lever 15 from engagement with the flap locking pin 14 so that as the pressure in bellows chamber 12 increases the bellows may deflect the flap 4 in the downward direction as illustrated by the arrow in Fig. 5. Restricting ports 20 and 20a will allow the pressure to increase in bellows chamber 12 at a substantially constant rate for any given air speed and will effectively prevent shock stresses due to sudden deflection of the flap 4. It will also be noted in Fig. 5 that auxiliary flap 58 on the upper surface of the wing 2 is closed so that no substantial air leakage therethrough can occur.

As the pressure builds up in the bellows chamber 12, the flap 4 will continue to deflect until the dynamic pressure exerted on the underside thereof by the relatively moving air stream will produce a total force on the flap equal to the force produced by the pressure acting on the upper side of the flap within the bellows chamber 12, and this will occur depending upon the design when the flap has dropped substantially to the dotted line position shown in Fig. 2. When the flaps 4 are extended the lift co-efficient of the airfoil section of the wing is considerably increased such that flight may be maintained at a lower airspeed, and further the flaps 4 will serve as air brakes to greatly increase the overall drag of the aircraft to greatly reduce the glide and permit landing, for example, of gliders and low-powered aircraft in a small space.

Just prior to landing or during flight the flaps may be retracted by movement of the control lever 66 to the rearmost position as seen in Fig. 1 which will cause the control lever 60 to be rotated in a clockwise sense from the neutral position to the position as illustrated in Fig. By moving to the position shown in Fig. 6 from the flap-extended position described in Fig. 5, the lever will move through the neutral position previously described with reference to Fig. 4 and the scoop 30 will be restored to the neutral position, at which time both locking assemblies 38 and 39 will be effective and then locking assembly 39 will release with locking assembly 38 serving as a hinge so that the scoop member 30 will be deflected so that its trailing edge projects into the relatively moving air stream to cause, by means of an ejector effect, removal of air from chamber 18 which will cause a reduction in pressure within the bellows chamber 12 so that the pressure exerted on the underside of the flap 4 will cause the same to retract the flap, and as soon as the flap is substantially in the retracted position, the pilot may move the control lever 66 (Fig. 1) again to the neutral position locking the flap in the retracted position and also rendering the locking assemblies 38 and 39 both effective to lock the scoop member 30 in the neutral position such as previously described with respect to Fig. 4, and at which time auxiliary flap 58 will move upward to connect the chamber 18 to the upper side of the wing through port 59 as previously described.

It will, of course, be understood that the flap opening, flap retracting, and locking may take place at any time during flight as desired by the pilot.

In order to insure synchronization of flap movement on the respective sides of the aircraft the pressure equalization conduit 12a shown in Fig. 1 is provided, and which conduit interconnects the bellows chambers 12 so that substantially equal pressure will exist therein so that both flaps 4 will be extended an equal amount and will retract at substantially the same rate.

The present invention while particularly adaptable for use on gliders and low-powered aircraft may be used on other aircraft where suitable and it is also to be understood that the scoop and scoop control mechanisms need not necessarily be mounted on the aircraft wings, but such control may be mounted on the aircraft fuselage for direct actuation by the pilot such that the scoop projects either at its leading or trailing edge into the relatively moving air stream, the scoop control mechanism being provided with an appropriate chamber or port associated therewith and connected by suitable conduits to the bellows chamber 12 for actuation of the bellows in the manner previously described. In this respect, locking mechanism for the scoop control would not be necessarily required, but the locking mechanism for the flap would be employed in substantially the same manner as herein illustrated and described.

It should also be understood that the bellows actuating and control mechanism herein described may be used not only for the purpose of actuating landing and glide control flaps, but also may be employed for the purpose of actuating pure drag producing devices for the purpose of limiting the diving speed of aircraft, producing rapid decelerations in flight and the like. The bellows and control mechanism therefore may be used for the actuation of double split flaps as currently used on certain dive bombing aircraft; that is, in addition to the split flap as shown in the drawings positioned on the underside of the aircraft wing. A similar flap arranged on the upper side of the wing adjacent the trailing edge may be elevated by the bellows for the purpose of greatly increasing the drag while still producing a large lift co-efficient and further the apparatus herein described may be applied for actuation of flaps either for the purpose of increasing the lift co-efficient or for increasing drag or both where such flaps are positioned other than on the trailing edge of the wing; that is, such as where the flaps are positioned intermediate the leading and trailing edges of the wings.

In general we deem the scope of our invention to embrace the use of a bellows actuating and control mechanism as herein described as applied to all cases where a flap or flaps are used on aircraft to produce either an increase in lift co-efficient, an increase in drag, or both.

For the case of the glider as herein illustrated and described one scoop is mounted in each wing panel to supply the necessary actuating pressures to the respective associated flaps, but however it is to be understood that under some circumstances it may be feasible to employ only one scoop to supply operating pressure for any and all flaps installed on the aircraft.

While a preferred form of the invention has been illustrated and described, it will be apparent to those skilled in the art that many changes may be made therein falling within the scope of the invention as defined by the appended claims.

We claim:

1. In a flap and flap control mechanism of the character including a flap pivotally mounted on an aircraft wing and adapted to be deflected downward from a neutral or retracted position into the relatively moving air stream and an expansible chamber bellows operable upon increase or decrease of the pressure therein with respect to the ambient atmospheric pressure to cause extension or retraction of said flap respectively; the improvement which comprises, providing a conduit having an entrance on the underside of the wing and an exit communicating with the interior of said bellows, a gate valve positioned at the entrance end of said conduit substantially flush with the contour of the undersurface of the associated aircraft wing when in a neutral position, control means for said valve including means for lowering the entrance edge of said valve into the relatively moving air stream to cause a flow of air through said conduit to create an increased pressure therein to inflate the bellows and extend the flap, means for deflecting the trailing edge of said valve into the air stream to cause a removal of air from said bellows through said conduit to reduce the pressure within said bellows to effect flap retraction, locking means operable to lock said valve when in the neutral position and to lock said flap when in the retracted position and a common means for actuating said valve control means and said locking means.

2. The structure as claimed in claim 1, in which adjustable means are provided associated with said conduit for restricting the flow of air therethrough in either direction to thereby control the rate of flap extension and retraction.

3. The structure as claimed in claim 1, in which means are provided for restrictively connecting said conduit to a region of reduced pressure at the upper surface of the associated aircraft wing to neutralize increase of pressure within said bellows and conduit due to leakage flow into said conduit, said means being rendered operative by said valve control means.

4. In a bellows operated flap construction for aircraft, means for inflating or deflating said bellows to cause flap extension or retraction comprising a control scoop device positioned on the aircraft, a conduit connecting said scoop device to the interior of said bellows, said scoop device being movable from a neutral position in one direction to cause air to be directed from the air stream through said conduit to inflate said bellows and in another position to deflate said bellows by an ejector effect to respectively extend and retract the flap, a manually actuated control means for selectively positioning said scoop and releasable locking means positioned adjacent the flap and cooperating therewith for locking said flap in the retracted position, said locking means being operatively connected to said control means for actuation thereby.

5. The structure as claimed in claim 4, in which said control scoop is mounted on the underside of the wing of the associated aircraft, said scoop comprising a plate pivotally supported intermediate its ends on crank links, and at its leading and trailing edges by releasable locking pivots, and manually actuated means for simultaneously releasing either one of said locking pivots and causing said plate to be rotated about the other of said locking pivots by said crank links, said plate being positioned at the entrance end of said conduit and operative to produce an increase in pressure therein upon deflection of the leading edge of said plate into the relatively moving air stream and to cause a reduction in pressure in said conduit upon deflection of the trailing edge of said plate into the relatively moving air stream.

6. In an actuating mechanism for a flap hinged to an aircraft wing, a bellows for causing extension or retraction of said flap upon increase or decrease respectively of the pressure within said bellows with respect to the ambient atmospheric pressure, a chamber connected to said bellows to conduct air to or from said bellows, a port in said chamber communicating with the undersurface of the aircraft wing, a flap device controlling said port and adapted to be flush with the undersurface of the wing when in a neutral position, control means for said flap device adapted to selectively move the entering or trailing edge of the control flap device into the relatively moving air stream to cause air to enter or to be withdrawn from said chamber to thereby cause flap extension or retraction, a second port in said chamber communicating with the upper surface of the associated wing and means for opening said port actuated by the control means for said flap device whereby when the flap device is in the neutral position and the bellows and flap retracted, said port will be open and produce a reduction in the pressure in said chamber sufficient to equal or exceed the increase in pressure therein due to leakage from the undersurface of the wing.

7. In combination, a pair of split flaps each pivotally mounted on an aircraft wing, expansible chamber bellows interposed between the flaps and wing structure for extending or retracting the flaps, means deriving energy from the relatively moving air stream and selectively operative to inflate or deflate the bellows to cause flap extension or retraction, means adjustable on the ground for restricting the flow of air to or from the bellows to govern the rate of extension or retraction thereof and a conduit interconnecting the bellows to maintain substantial equalization of pressure therein to provide synchronization of movement of said flaps.

8. The structure as claimed in claim 4, in which separate releasable locking means are provided positioned adjacent said scoop and effective to lock said scoop in the neutral position and means operatively connected to said manually actuated control means for actuating said last named locking means, said last named locking means being effective to lock the scoop in the neutral position simultaneous with the locking of the flap in the retracted position.

ARTHUR L. LOWELL.
KARL F. FROMUTH.